US008863093B1

(12) United States Patent
Chou et al.

(10) Patent No.: US 8,863,093 B1
(45) Date of Patent: Oct. 14, 2014

(54) LOAD-TIME INSTRUMENTATION OF VIRTUAL MACHINE PROGRAM CODE

(75) Inventors: Andy Chou, San Francisco, CA (US); John Kodumal, Oakland, CA (US)

(73) Assignee: Coverity, Inc., San Francisco, CA (US)

( * ) Notice: Subject to any disclaimer, the term of this patent is extended or adjusted under 35 U.S.C. 154(b) by 1237 days.

(21) Appl. No.: 12/399,885

(22) Filed: Mar. 6, 2009

(51) Int. Cl.
*G06F 9/44* (2006.01)
*G06F 9/45* (2006.01)
*G06F 9/455* (2006.01)

(52) U.S. Cl.
USPC ........... 717/130; 717/124; 717/132; 717/133; 717/151; 717/152; 717/155; 717/156; 717/157; 717/162; 717/165; 717/166; 717/167; 718/1

(58) Field of Classification Search
USPC .................. 717/152, 155, 156, 157
See application file for complete search history.

(56) References Cited

U.S. PATENT DOCUMENTS

| | | | | |
|---|---|---|---|---|
| 5,950,008 A | * | 9/1999 | van Hoff | 717/139 |
| 6,968,540 B2 | * | 11/2005 | Beck et al. | 717/130 |
| 7,401,324 B1 | * | 7/2008 | Dmitriev | 717/130 |
| 2002/0049963 A1 | * | 4/2002 | Beck et al. | 717/130 |
| 2004/0153996 A1 | * | 8/2004 | Boykin et al. | 717/118 |
| 2004/0177260 A1 | * | 9/2004 | Gilfix et al. | 713/193 |
| 2005/0028152 A1 | * | 2/2005 | Hays et al. | 717/166 |
| 2006/0129989 A1 | * | 6/2006 | Fleischer | 717/124 |
| 2006/0161896 A1 | * | 7/2006 | Hicks et al. | 717/124 |
| 2006/0271575 A1 | * | 11/2006 | Harris et al. | 707/100 |
| 2007/0011667 A1 | * | 1/2007 | Subbiah et al. | 717/148 |
| 2007/0061792 A1 | * | 3/2007 | Atsatt | 717/151 |
| 2007/0061795 A1 | * | 3/2007 | Atsatt | 717/166 |
| 2007/0180439 A1 | * | 8/2007 | Sundararajan et al. | 717/158 |
| 2008/0126781 A1 | * | 5/2008 | Czajkowski et al. | 713/2 |
| 2008/0134207 A1 | * | 6/2008 | Chamieh et al. | 719/315 |
| 2008/0276227 A1 | * | 11/2008 | Greifeneder | 717/130 |
| 2009/0100154 A1 | * | 4/2009 | Stevenson et al. | 709/220 |
| 2009/0172653 A1 | * | 7/2009 | Elliott | 717/148 |
| 2010/0070960 A1 | * | 3/2010 | Atsatt | 717/166 |
| 2010/0153644 A1 | * | 6/2010 | Bauchot et al. | 711/118 |

* cited by examiner

*Primary Examiner* — Charles Swift
(74) *Attorney, Agent, or Firm* — Schwegman Lundberg & Woessner, P.A.

(57) ABSTRACT

A method to instrument program code for a virtual machine that comprises, in the course of loading a class to a virtual machine, adding code to the class to declare a field that corresponds to a field declared in a first bootstrap class.

20 Claims, 10 Drawing Sheets

LOAD-TIME INSTRUMENTATION OF VIRTUAL MACHINE PROGRAM CODE

BACKGROUND OF THE INVENTION

1. Field of the Invention

The invention relates to in general to dynamic analysis of computer software targeted to a virtual machine, and more particularly, to instrumenting program code executed using a virtual machine.

2. Description of the Related Art

A typical computing system comprises a hardware layer, an operating system layer and an application layer that runs on top of the operating system. Virtualization software abstracts a virtual machine (VM) by interposing an additional layer within the system. A virtual machine itself is a target for a programmer or compilation system. A VM runs programs written and compiled for its abstract machine definition.

An application layer VM, for example, sits as an application program on top of an operating system. A typical application level VM runs as a normal application inside an operating system. The VM can be created when a process is started and can be destroyed when the process exits. A VM abstracts away details of the underlying hardware and operating system to allow a program targeted to the VM to execute in the same way on different computer system platforms. Java, Smalltalk and the .NET Framework are examples of application layer VM environments. A Java virtual machine (JVM) is a virtual machine that executes object oriented code known as bytecode that is compiled specifically to it. The Java programming language does not rely on platform-specific instructions sets, such as APIs specific to any one operating system to access or display resources such as files. Rather, in a Java runtime environment, Java-specific commands are interpreted.

Figure 1A:
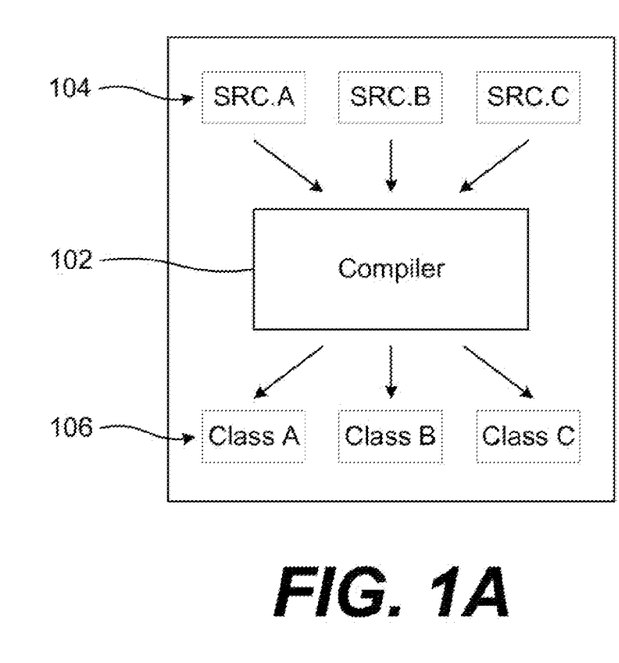
FIGS. 1A-1B are illustrative drawings of a compile-time environment (FIG. 1A) and a run-time environment (FIG. 1B) in a VM environment.
Figure 1B:
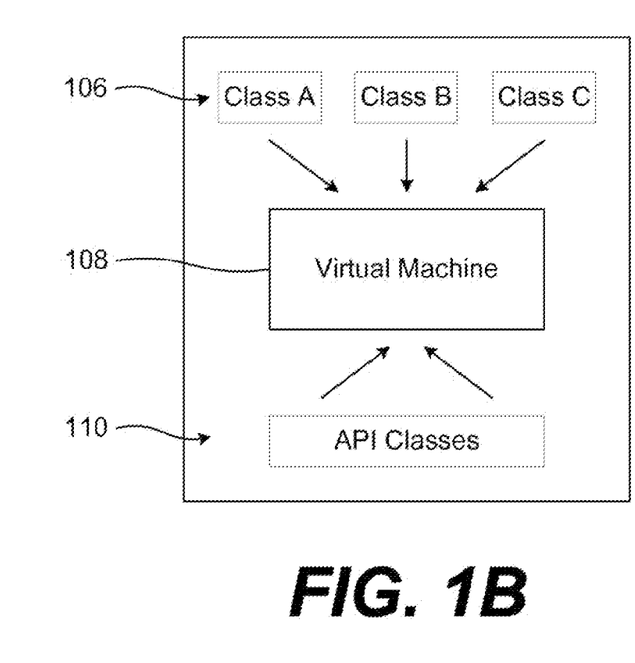

FIGS. 1A-1B are illustrative drawings of a compile-time environment (FIG. 1A) and a run-time environment (FIG. 1B) in a VM environment. In particular, the example in FIGS. 1A-1B illustrates the operation of a JVM. FIG. 1A shows that a Java compiler 102 compiles user program source files 104 written in the Java programming language to class files 106 on the JVM, which comprise the program code executed by the machine. In a Java program, for example, system resources are accessed by calling methods in classes that that comprise program code to implement the Java Application Programming Interface (API). FIG. 1B shows that a JVM 108 runs a program comprising user program class files 106, it fulfills user program calls by user application program 106 to the Java API by invoking methods from the class files 110 that implement the Java API.

Figure 2:
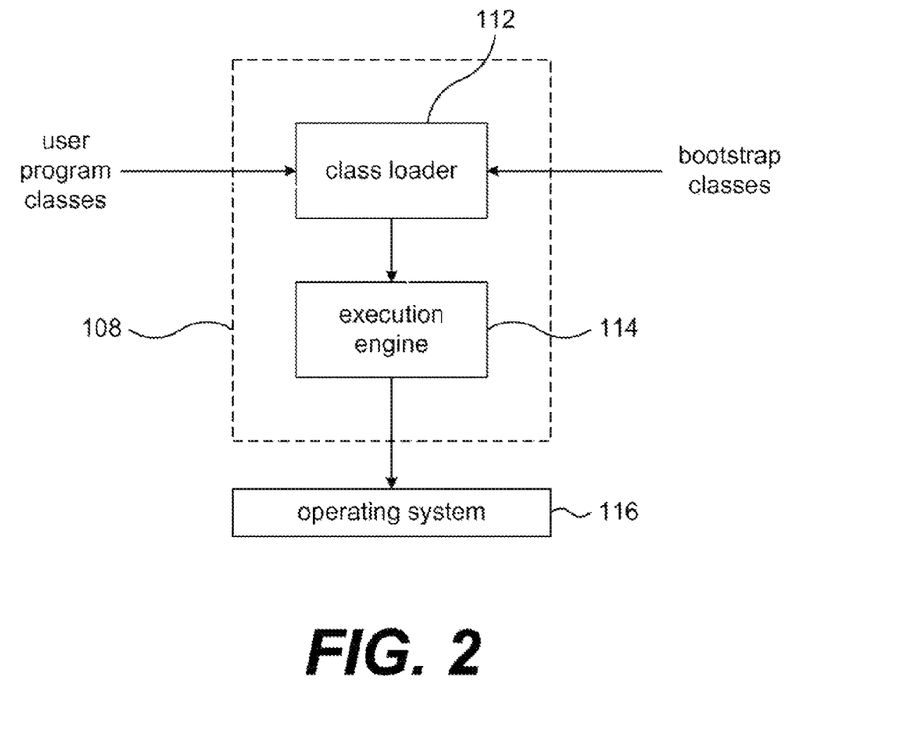
FIG. 2 is an illustrative drawing of an application layer VM that includes a class loader subsystem and an execution engine.

FIG. 2 is an illustrative drawing of an application layer VM 108 that includes a class loader subsystem 112 and an execution engine 114. The illustrated application level VM runs on top of an operating system layer 116 and executes object oriented program code. It loads class files and executes the code contained within those files. More specifically, for example, a JVM, loads class files and executes the bytecodes that they contain. A JVM class loader 112 loads class files from both a user program (e.g., user-defined program code classes) and the Java API (e.g., bootstrap classes). In general, only those class files that are actually required by a running program are loaded into the virtual machine. This is sometimes referred to as 'lazy' execution in that JAVA class files may be loaded on an as needed basis. In a Java environment, for example, execution can take different forms. For instance, the execution engine 114 can be implemented to interpret the bytecodes of a method in a program one at a time. Alternatively, for example, the execution engine 114 can be implemented to employ a just-in-time compiler in which bytecodes of a method are compiled to native machine code the first time the method is invoked. The native machine code for the method is cached so it can be re-used later when that same method is invoked again.

A JVM class loader subsystem 112 typically includes two kinds of class loaders: a bootstrap class loader and user-defined class loaders. The bootstrap class loader is a part of the virtual machine implementation. User-defined class loaders are part of the user-program written in the Java language that runs on the JVM. Classes loaded by different class loaders are placed into separate name spaces inside the Java virtual machine. The JVM class loader subsystem 112 handles more than just locating and importing the binary data for classes. It also verifies the correctness of imported classes, allocates and initializes memory for class variables, and assists in the resolution of symbolic references, for example. The JVM implementation employs a bootstrap class loader, which knows how to load trusted classes, including the classes of the Java API, so called 'bootstrap classes'. Java employs a linking model to enable a designer to develop user-defined class loaders that extend a Java application in custom ways at run-time. Through user-defined class loaders, a Java application can load and dynamically link to classes and interfaces that were unknown or did not even exist when the application was compiled.

An instrumentation routine may be used to identify, locate, and modify specific computer program components to enable monitoring, analysis or debugging, for example. Such an instrumentation process is sometimes characterized as "instrumenting the code." In a Java environment, instrumentation typically involves the addition of instrumentation code (i.e. bytecode) to program code of methods defined in classes for the purpose of gathering data to be utilized by dynamic analysis tools, used for optimizing, characterizing, benchmarking, debugging or otherwise improving the robustness of a software program as it executes, for example. The additional instrumentation code generally does not fundamentally change the state or behavior of the application modified through the addition of such instrumentation code. Examples of such analysis tools include monitoring agents, profilers, coverage analyzers, event loggers and debuggers, for example.

One approach to instrumentation in a Java environment involves use of a Java 'Instrumentation' class and special Java libraries called Java agents. A Java agent typically utilizes a pluggable library that runs embedded in a JVM and that intercepts the classloading process. This allows a software agent to monitor the classloading process and to instrument the bytecode of the classes to provide informational callbacks into the agent's libraries, for example. Thus, one approach to the instrumentation of an object-oriented application targeted to a VM is to modify classes through the addition of instrumentation code (e.g., bytecode) as the classes are loaded.

However, in a JVM environment, these agents typically are loaded only after the JVM has embarked upon bootstrapping of bootstrap classes. At that stage of execution, several hundred bootstrap classes already may have been loaded but not yet have been processed by any instrumentation agent. Thus, these bootstrap classes will not have been instrumented by the instrumentor. One proposed solution to the problem is to statically instrument the bootstrap classes, which involves instrumenting them ahead of time and causing the JVM to use the instrumented classes when it starts up. However, this solution can be problematic since it involves modifying where the JVM loads bootstrap classes, which can lead to ease of use issues. See, Walter Binder, Jade Hulaas and Philippe Moret, Reengineering Standard Java Runtime Systems through Dynamic Bytecode Instrumentation, Seventh IEEE Working Conference on Source Code Analysis and Manipulation, SCAM 2007, Volume, Issue, Sep. 30-Oct. 1, 2007, pages, 91-100. Moreover, classes of the computer software based instrumentation process itself, i.e. its instrumentation classes, may not be instrumented either.

Thus, there is a need for improvement of techniques to instrument of computer program applications targeted to VMs that employ bootstrap classes. The present invention meets this need.

SUMMARY OF THE INVENTION

In one aspect, a method is provided to instrument program code for execution in a virtual machine. In some embodiments, an analysis field is declared in a selected class in the course of loading the class to a virtual machine. The analysis field corresponds to a field declared in a bootstrap class that extends the selected class.

The analysis field declared in the selected class can be used to gather and store data for use in dynamic analysis. A field declared in a bootstrap class can be monitored through an analysis field declared in the selected class that extends such bootstrap class. Thus, rather than modify the bootstrap classes, other classes are instrumented that extends such bootstrap classes.

These and other features and advantages of the invention will become apparent from the following description of embodiments thereof in conjunction with the appended drawings.

BRIEF DESCRIPTION OF THE DRAWINGS

The aforementioned features and advantages of the invention, as well as additional features and advantages thereof, will be more clearly understandable after reading the detailed description of embodiments of the invention in conjunction with the following drawings.

DETAILED DESCRIPTION OF THE PREFERRED EMBODIMENTS

The following description is presented to enable any person skilled in the art to make and use a computer implemented system and method and apparatus to instrument program code for use in a virtual machine in accordance with embodiments of the invention, and is provided in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein.

For some kinds of analysis it may be beneficial to instrument a program by adding field definitions to classes, herein referred to as 'analysis fields'. In some embodiment, analysis fields may be created for each of certain declared fields in the original program. Classes may inherit behavior and/or data from other classes referred to as superclasses. A subclass may override behavior that it inherits from its superclass, but if it does not, the behavior of the subclass may default to the behavior defined by a superclass of that subclass. A given reference to a field or method of a class may thus relate to something declared within the class itself or to something declared in a superclass of that class. Depending on the type of analysis being performed, an instrumentor may determine that an analysis field should be declared in a superclass of a class to be instrumented. That superclass may or may not have been loaded prior to the instrumentation of the class by the instrumentor.

As used herein the term 'field' refers to a region of a class that is allocated for a particular item of information. A field typically has attributes associated with it. In a class definition, fields may represent data values that are specific to each instance of the class, or common to all instances of the class. Fields may represent numerical quantities such as counters, sizes, or distances. Fields may also string data entities such as names, addresses, and so forth. Field types may be simple data types built into the programming language, or complex data types that are defined by the user, and which often consist of combinations of simpler data types. Some fields may represent low-level resources such as files, sockets, database connections. These fields are associated with additional data that is owned by the virtual machine, operating system, or other low-level component of the system.

As used herein, the declaration of a field implies specifying its type, name, and sometimes additional attributes. In some programming languages the type may be omitted and automatically inferred by the compiler, or determined at runtime.

The declaration of a field can imply the reservation of memory when an object or class is created, when the program is initialized, or no memory at all (in the case of constants in some implementations). The meaning of a field declaration varies widely between programming languages, but usually it implies the creation of a named value within a class or structure, with a type and a certain scope of visibility.

Classes may inherit behavior and/or data from other classes. A subclass may override inherited behavior, but if it does not, then the behavior of the subclass may default to that defined by the superclass. A given reference to a field or method of a class may thus relate to something declared within the class itself or to something declared in a superclass.

Figure 3:
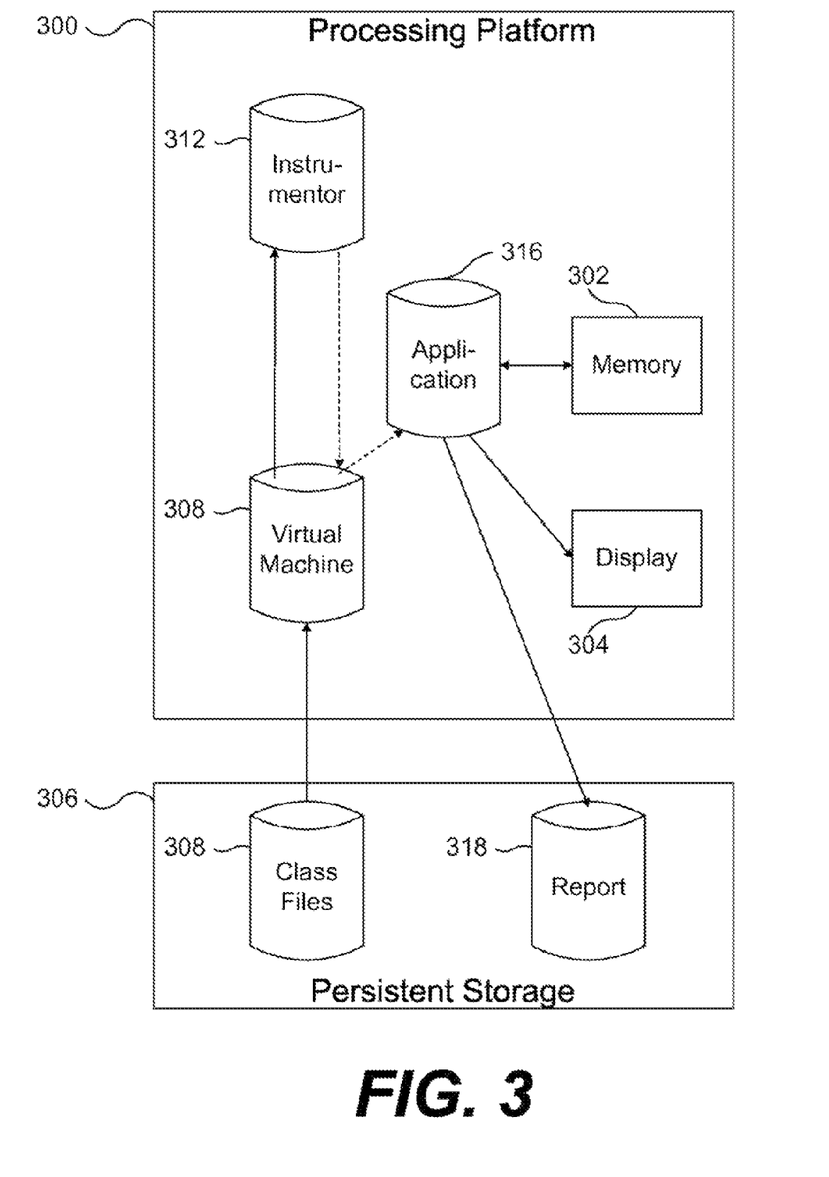
FIG. 3 is an illustrative drawing showing a generalized diagram representing the instrumenting of an application that is to run on a virtual machine.

FIG. 3 is an illustrative drawing showing a generalized diagram representing the instrumenting of an application that is to run on a virtual machine. A processing platform 300 such as a computer system that includes one or more processors (not shown), memory media 302 and a display 304. The processing platform 300 is coupled to persistent storage 306, such as a hard drive or other storage medium A virtual machine (VM) 308 runs as a computer program on the processing platform 300, and loads class files 310 from storage 306, and provides them to an instrumentor application 312 that also runs on the platform. The instrumentor 312 instruments the class files and makes them available to a user application 316. Instrumentor 312 may alternatively hand the instrumented class files back to VM 308 so that the VM can make the classes available to user application 316 as indicated by the dotted lines. The user application 316 may access memory media 302 during execution. The application 316 also may create a report 318 on storage 306. Report 318 may be sent to storage that is different from the storage on which class files 310 reside, or may be sent alternatively or additionally to a display 304, for example.

Figure 4:
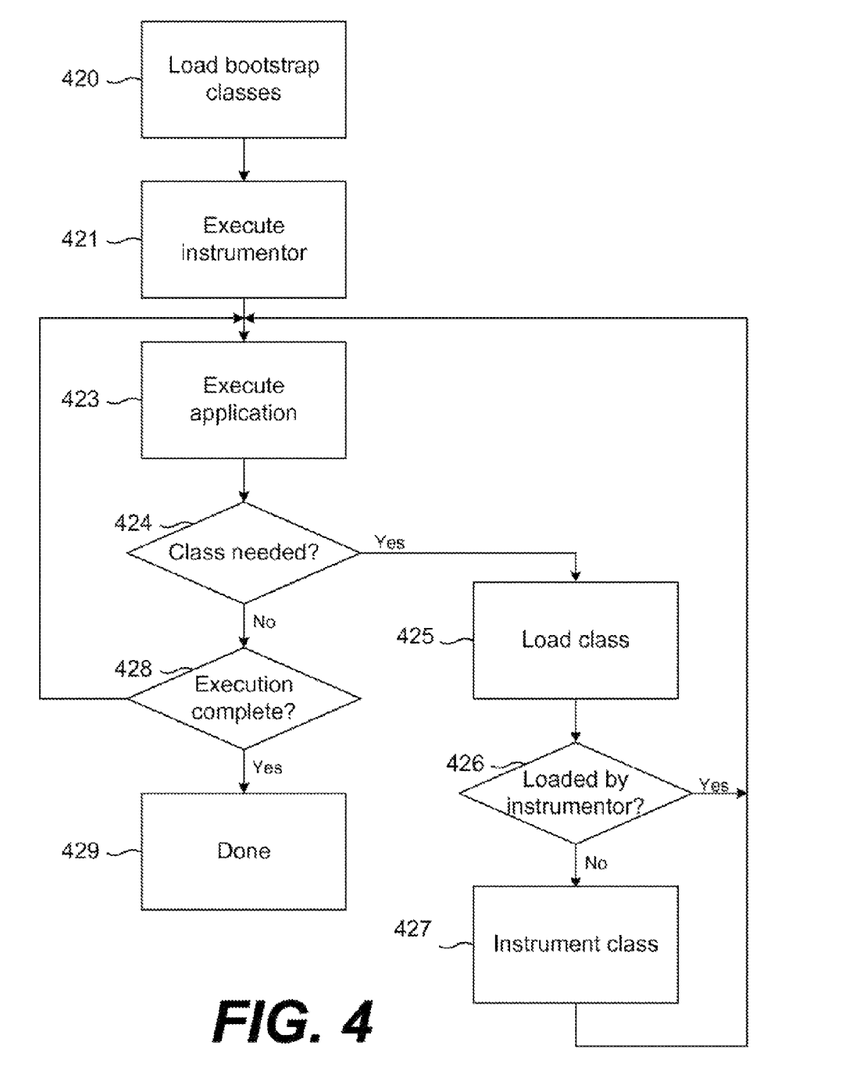
FIG. 4 is an illustrative flow diagram of a computer program process to instrument a user application program that runs on a virtual machine and that is expressed in an object oriented language.

FIG. 4 is an illustrative flow diagram of a computer program process 400 to instrument a user application program that runs on a virtual machine and that is expressed in an object oriented language. In this example, the VM runs on an application layer and loads user classes comprising program code as needed by the user application. Throughout this description reference is made to 'blocks,' which correspond to computer program processes running on a computer system to perform a function associated with the block. Bootstrap class loading block 420 loads bootstrap classes. Many bootstrap classes are loaded prior to loading of user application classes and prior to loading of the instrumentation classes. An instrumentor execution block 421 commences execution of an object oriented instrumentor process. An application execution block 423 commences execution of a user application. Thus, the instrumentor and a user application run in parallel. It will be appreciated that execution of the instrumentor and execution of the application involves the loading of classes on an 'as needed' basis for execution on the VM. That is, for example, an additional class may be loaded when it is called by a previously loaded class.

Decision block 424 monitors the loading of classes, which can be loaded for either the user application program or the instrumentor program which run in parallel to determine whether program execution requires loading of an additional class. If decision block 424) determines that no additional class is to be loaded at that moment, then decision block 428 determines whether execution of the application program is complete. If decision block 428 determines that execution of the user application program is complete, then the application and instrumentation are done as indicated by block 429. On the other hand, if decision block 428 determines that execution of the user application program is not complete, then the process returns to application execution block 423, and the user application and the instrumentor continue to run in parallel. If on the other hand, decision block 424 determines that an additional class is to load, then Class loader block 425 loads the additional class for execution. This class may have been loaded due to a requirement of either the instrumentor or the user application. It will be understood that since the instrumentor is the intercepting program, its own classes are not to be intercepted. Decision block 426 determines whether the additional class is required for the instrumentor or for the user application. If decision block 426 determines that the additional class is loaded for the user application, then instrumentor block 427 instruments the additional class as it loads. If decision block 426 determines that the additional class is loaded for the instrumentor, then the process returns to application execution block 423, and the user application and the instrumentor continue to execute in parallel. If on the other hand, decision block determines that the additional class is loaded for the user application, then instrumentation block 427 instruments the class. Once the class has been loaded and instrumented, the process returns to the application execution block 427.

Figure 5A:
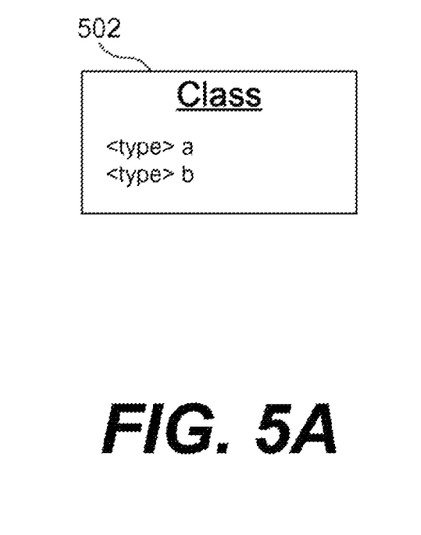
FIGS. 5A-5B are illustrative drawings of a class structure before (FIG. 5A) and after (FIG. 5B) to addition of instrumentation involving the adding additional fields.
Figure 5B:
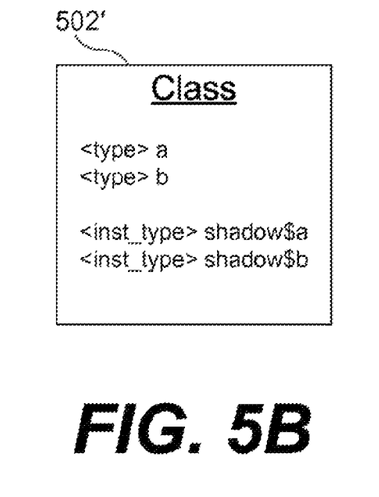

FIGS. 5A-5B are illustrative drawings of a simplified class structure before (FIG. 5A) and after (FIG. 5B) addition of certain instrumentation fields. In the following example, for selected fields declared in a user application program, a behavior associated with that field is to be tracked with the aid of an added analysis field sometimes referred to herein as a "shadow field." As used herein, an analysis field is a field added to a class during an instrumentation process for the purpose of gathering data as the user program executes for use in optimizing, characterizing, benchmarking, debugging or otherwise improving the robustness of the user application program, for example. Additional instrumentation code (not shown) also may be added to the class for the purpose of gathering and storing data in the shadow field and/or for the purpose of calling a dynamic analysis tool, for example. In some embodiments, a shadow field captures data that occurs within the original field that is 'shadowed' by such field in order to make such data available to other instrumentation code (not shown).

For the purposes of this description, a shadow field associated with a field named 'x' will be named 'shadow$x'. FIG. 5A shows an illustrative class 502 that declares 'types' for two fields a and b. In some embodiments, a 'type' is declared for each field. Fields a and b may have the same or different types. In the course of an instrumentation process such as that of FIG. 4, the class of FIG. 5A is modified through the addition of declarations of shadow fields, shadow$a and shadow$b, that correspond to fields a and b, respectively. In some embodiments, these shadow fields may have a specific type defined by the instrumentation methodology, referred to as 'inst_type' in the drawing of FIG. 5B. The inst_type can be any type that is useful for the specific analysis to be being performed through the instrumentation of the class. If the analysis requires that the shadow field type vary based on some aspect of the field itself, then shadow$a and shadow$b could have different types. More than one shadow field may be declared for each original field.

As explained above, the class represented by FIGS. 5A-5B also may be modified through the instrumentation process, which may provide instructions used to effect an analysis process. For example, an instrumentation process may provide instrumentation instructions (not shown) within methods of the same class 502' as modified in FIG. 5B. Shadow fields may be used by such instrumentation instructions to track the states of fields referenced in such instrumentation instructions.

Figure 6:
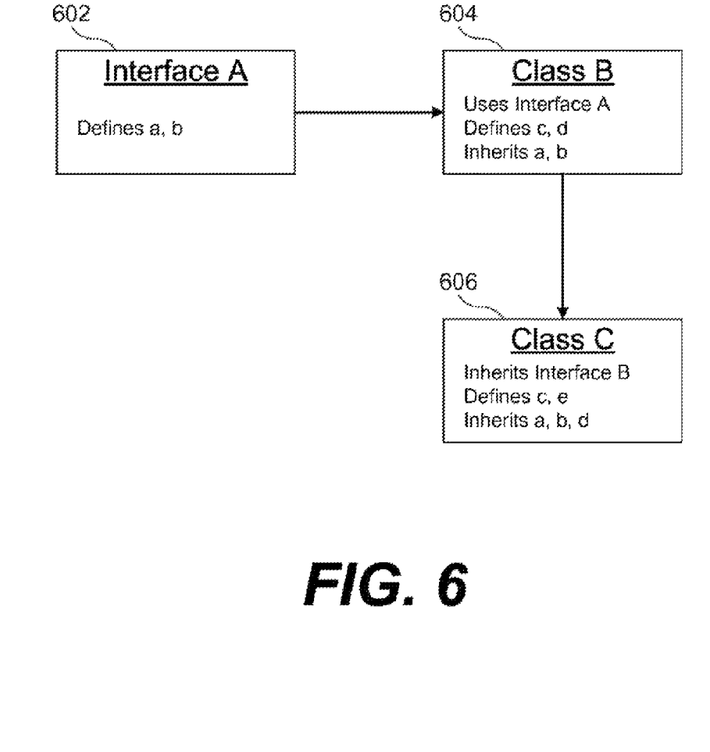
FIG. 6 is an illustrative drawing representing inheritance relationships between two illustrative classes and an interface.

FIG. 6 is an illustrative drawing representing inheritance relationships between two illustrative classes and an interface. In general, an interface is a software based structure that provides methodology to interact with a software based object structure, but that does not provide information as to how a class actually works. One or more classes may use or "implement" an interface in order to conform to an understood interaction methodology. While a program is running, a call to a class may not be distinguishable from a call to an interface because a field being accessed might have been declared in the class (or superclass) or in an interface, and the syntax of the language may not denote the distinction between a class and interface field.

Referring to FIG. 6, Interface A 602 declares two fields, a and b. Class B 604 implements Interface A, and therefore, inherits fields a and b. Class B also declares two new fields, c and d. Class C 606 extends Class B, and therefore, inherits from Class B and Interface A. However, Class C declares two fields c and e. Even though Class B also declares a field c that Class C could inherit, the definition within Class C takes priority and overrides the inherited definition of field c. Therefore Class C only inherits fields a, b, and d from Class B (a and b coming from Interface A originally).

FIGS. 7A-7D are an illustrative diagrams depicting processes to resolve field names within the class C of FIG. 6. For example, during execution of a program by a VM that involves invoking the example interface and classes of FIG. 6, the VM resolves field names based upon inheritance. More particularly, for example, when a field name is encountered in program code corresponding to an interface or a class, the VM may resolve the name by backtracking up the inheritance path until a definition is found.

Figure 7A:
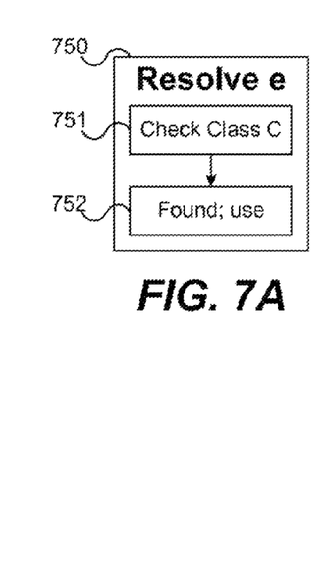
FIGS. 7A-7D are an illustrative diagrams depicting processes to resolve field names within class C of FIG. 6.

FIG. 7A is an illustrative flow diagram representing a computer program controlled process 750 to resolve field name e. In this example, the field e resolution process begins with a determination of whether field e is defined within Class C. Since block 751 finds a definition for field e within Class C, that definition of field e is used, and the field e resolution process ends at block 752.

Figure 7B:
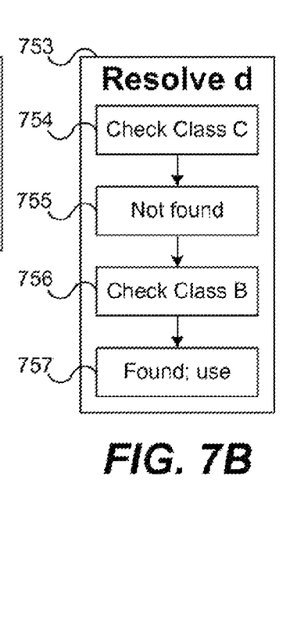

FIG. 7B is an illustrative flow diagram representing a computer program controlled process to 753 to resolve field name d. In this example, the field d resolution process begins with a block 754 determining whether field d is defined in Class C. At block 755, a determination is made that field d is not defined in Class. In block 756, the process traverses up the inheritance tree to determine whether field d is defined within Class B. In block 757, a determination is made that a definition of field d is provided in Class B, and the process of resolving field name d ends.

Figure 7C:
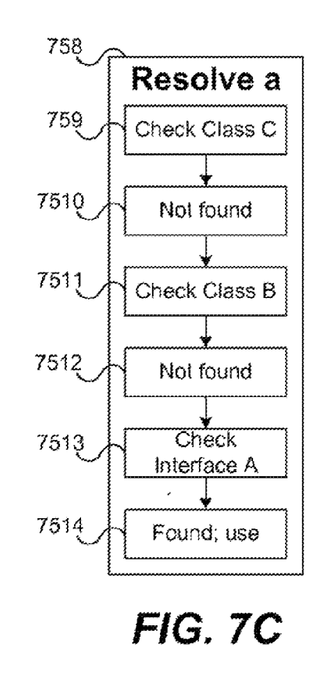

FIG. 7C is an illustrative flow diagram representing a computer program controlled process to 758 to resolve field name a. In this example, block 759 the field d resolution process begins with a determination of whether field d is defined in Class C. Block 7510 determines that field a is not defined in Class C. Next, the process traverses up the inheritance chain to determine whether field a is defined within Class B at block 7511. In block 7512, a determination is made that field a is not defined in Class B. Accordingly, at block 7513, the process traverses up the inheritance chain to determine whether field a is defined within Interface A. A determination is made that a definition of field a is provided in Interface A, and the process of resolving field name a ends at block 7514.

Figure 7D:
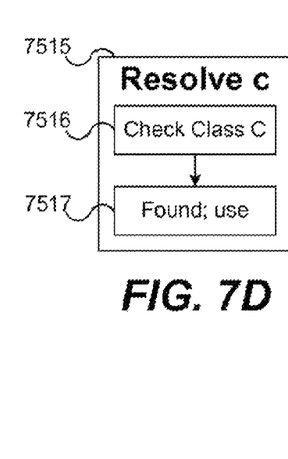

FIG. 7D is an illustrative flow diagram representing a computer program controlled process 7515 to resolve field name c. In this example, block 7516 begins the field c resolution process with a determination of whether filed e is defined within Class C. Since a definition for field c is found within Class C, that definition of field c is used, and the field e resolution process ends at block 7517.

Unfortunately, a problem may arise due to load-time instrumentation that involves a class that inherits a field from a bootstrap class. For example, assume that a given class inherits a definition of a field x from a bootstrap class. Since the bootstrap class itself is not instrumented, no analysis field corresponding to field x is declared in the bootstrap class. Thus, the given class may inherit a field x for which an analysis field has not been defined. The absence of such analysis field may result in erroneous instrumentation or analysis.

Figure 8:
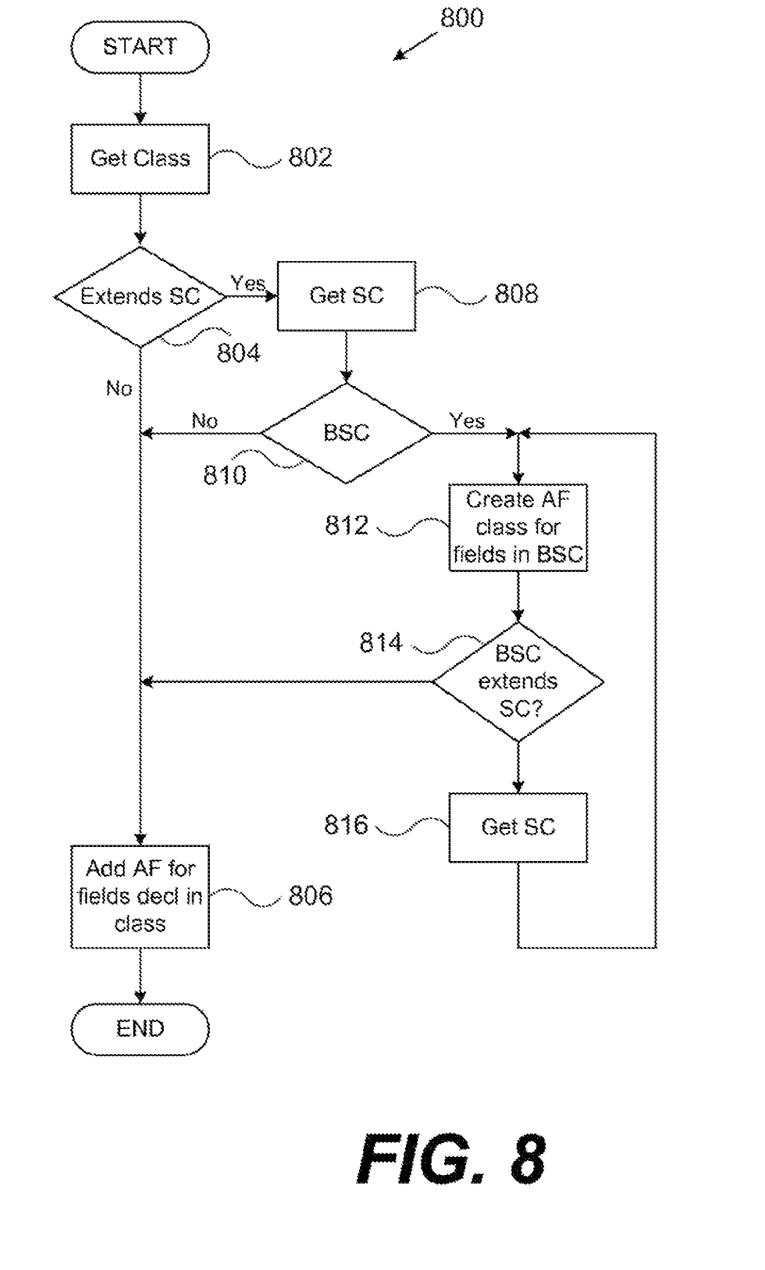
FIG. 8 is an illustrative flow diagram of a computer program process to instrument classes of a program with declarations of analysis fields that may be inherited from one or more superclasses in accordance with some embodiments of the invention.

FIG. 8 is an illustrative flow diagram of a computer program process 800 to instrument classes of a program with declarations of analysis fields that may be inherited from one or more superclasses in accordance with some embodiments of the invention. In block 802, a class is selected for instrumentation. Decision block 804, determines whether the selected class extends a superclass. If decision block 804 determines that the selected class does not extend a superclass, then block 806 declares within the selected class, respective analysis fields (e.g., 'shadow fields') that correspond to respective fields declared within that selected class.

If on the other hand, decision block 804 determines that the selected class does extend a super class, then block 808 obtains information concerning the superclasses that the selected class extends. Decision block 810 determines whether the superclass extended by the selected class is a bootstrap class. If decision block 810 determines that the extended superclass is not a bootstrap class, then the process 800 proceeds to block 806, which declares respective analysis fields (e.g., 'shadow fields') that correspond to respective fields within the selected class.

If on the other hand, decision block 810 determines that the superclass that extends the selected class is a bootstrap class, then block 812 declares within the selected class, respective analysis fields (e.g., 'shadow fields') (if any) that correspond to respective fields declared within the bootstrap class.

It will be noted that decision block 810 determines whether a class is a bootstrap class. In some embodiments, in order to make this determination, bootstrap class names are added to a bootstrap class list that is created in computer readable storage media in the course of the loading of bootstrap classes by the VM. Block 810 refers to this list to determine whether or not class a superclass that extends a class that is being loaded and instrumented is a bootstrap class.

It will also be noted that decision block 810 causes the process 800 to proceed to block 812 only if the selected class is a direct descendant of the bootstrap class. That is, if the selected class extends a class that is not a bootstrap class, then the process 800 proceeds to block 806 instead.

Decision block 814 determines whether the bootstrap class extends a superclass. Note that a superclass that extends a bootstrap class is itself a bootstrap class. If decision block 814 determines that the bootstrap class does not extend a superclass, then the process 800 proceeds to block 806, which declares within the selected class, respective analysis fields (e.g., 'shadow fields') that correspond to respective fields declared within that selected class.

If on the other hand, the decision block 814 determines that the bootstrap class does extend a superclass, then block 816 obtains information concerning the superclass. Next, block 812 declares within the selected class, respective analysis fields (e.g., 'shadow fields') (if any) that correspond to respective fields declared within the bootstrap superclass. The loop that includes blocks 812-816 continues until the last extended superclasses is identified.

Depending upon the computer programming language, the superclass check of decision block 814 may not terminate at the point at which no more superclasses are identified, but alternatively, may end when the identified superclass is some language-defined class from which all classes are derived. The 'Object' class is an example of such a class in the Java language.

Thus, analysis field are declared within a selected class for fields declared within that class and also for fields declared in bootstrap classes extended by the selected class. Even though a bootstrap class itself is not modified through addition of an analysis field, a class that inherits a field from such bootstrap class can be modified through addition of an analysis field corresponding to such bootstrap class field. Thus, fields declared in a bootstrap class can be monitored through addition of analysis fields added to a class that extend such bootstrap classes. In particular, for example, instrumentation code (not shown) added to a class can refer to analysis fields to obtain dynamic (i.e., run-time) information concerning fields of the class.

Figure 9A:
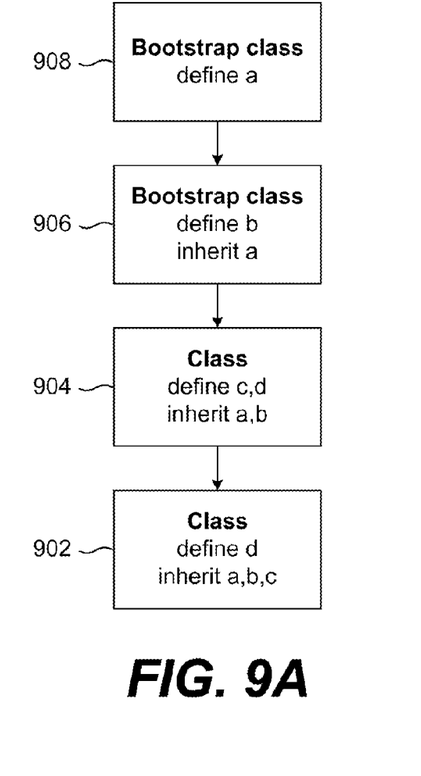
FIGS. 9A-9B are illustrative drawings of a class hierarchy before (FIG. 9A) and after (FIG. 9B) instrumentation according to the process of FIG. 8 to add analysis fields to subclasses in accordance with some embodiments of the invention.
Figure 9B:
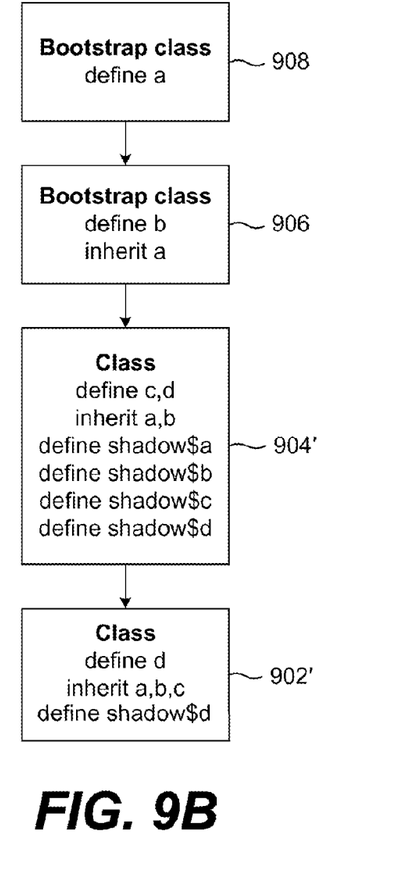

FIGS. 9A-9B are illustrative drawings of a class hierarchy before (FIG. 9A) and after (FIG. 9B) instrumentation according to the process of FIG. 8 to add analysis fields to subclasses in accordance with some embodiments of the invention. It is assumed for the purpose of this explanation that a first non-bootstrap class 902 is in midst of being instrumented according to the process of FIG. 8 as it is loaded to a VM. Referring to FIG. 9A, the first non-bootstrap class 902 defines field d and inherits declarations for fields a, b and c from a second non-bootstrap class 904. The second class 904 defines fields c and d and inherits definitions of fields a and b from a third bootstrap class 906. The third class 906 defines field b and inherits a definition of field a from a fourth bootstrap class 908. The fourth bootstrap class 908 defines field a.

FIG. 9B shows the same class hierarchy, referenced with identical primed reference numerals after the modification through addition of analysis fields in accordance with the process of FIG. 8. Assume that the first class 902 in FIG. 9A is in the process of being loaded. Referring to FIGS. 8 and 9A, block 804 determines that the first non-bootstrap class 902 extends a superclass. Block 808 obtains information concerning the superclass extended by the first class 902, i.e., the second class 904/904'. Decision block 810 determines that the extended superclass 904/904' is not a boostrap class. Therefore, process 800 proceeds to block 806, which declares an analysis class shadow$d that corresponds to the class d, which is declared in the first class.

Now, assume that the second class 904 is in the process of being loaded. Referring to FIGS. 8 and 9A, block 804 determines that the second class 904 extends a superclass. Block 808 obtains information concerning the superclass extended by the second class 904, i.e., the third class 906. Decision block 810 determines that the extended superclass 906 is a bootstrap class. Block 812 creates an analysis field shadow$b within the modified second non-bootstrap class 904' that corresponds to the field b declared in the third (bootstrap) class that is extended by the second class 904/904'. Decision block 814 determines that the third (bootstrap) class 906 extends another class, i.e. fourth class 908. Block 816 obtains information concerning the fourth (bootstrap) class 908 that is extended by the third class 906. Block 812 creates an analysis field shadow$a within the modified second class 904' that corresponds to the field a declared in the fourth bootstrap class 908 that is extended by the third bootstrap class 906.

Decision block 814 determines that the fourth class 908 does not extend another class. Accordingly, process 800 proceeds to block 806, which declares analysis fields shadow$c and shadow$d within the modified second non-bootstrap class 904' that correspond to fields c and d that are declared within the second class 904.

The modified first and second classes 902' and 904' each includes a declaration of an analysis class for field d (i.e., shadow$d). As explained with reference to FIGS. 7A-7D, a local definition of a field within a class supersedes a definition of the same field in a superclass extended by that class. Both the first non-bootstrap class 902/902' and the second non-bootstrap class 904/904', which is a superclass of the modified first class 902', define field d. Accordingly, although the declaration of field d in the first class 902/902' supersedes the declaration of field d in the second class 904/904', analysis fields are declared that correspond to each declaration of field in each such class.

The second non-bootstrap class 904/904' is a direct descendent of the third and fourth bootstrap classes 906 and 908. Whereas, the first non-bootstrap class 902/902' is not a direct descendant of the third and fourth bootstrap classes 906 and 908 since the second non-bootstrap class 904/904' is disposed in the inheritance hierarchy between the first non-bootstrap class 902/902' on the one hand and the third and fourth bootstrap classes 906 and 908 on the other hand.

Moreover, analysis fields for fields declared in bootstrap classes 906 and 908 are declared in the second non-bootstrap class. In this example, the first and second classes 902 and 904 may be user application classes, for example. The process 800 is operative to define analysis classes within user application program classes that correspond to fields declared in bootstrap classes, regardless of the order in which such user application classes are loaded. That is, for example, the process 800 is operative whether the first class is loaded before or after the second class is loaded. Thus, even though the bootstrap classes typically loaded before the loading of the user program classes, fields in such bootstrap classes that are inherited by such application classes can be monitored for analysis through addition of analysis fields, for example.

Figure 10A:
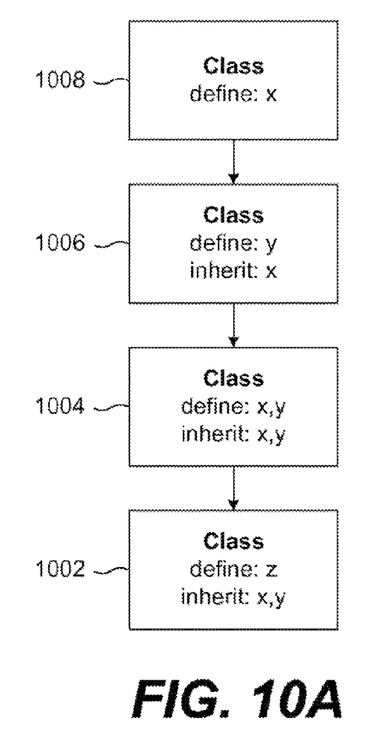
FIGS. 10A-10B are illustrative drawings of another class hierarchy before (FIG. 10A) and after (FIG. 10B) instrumentation according to the process of FIG. 8 to add analysis fields in accordance with some embodiments of the invention.
Figure 10B:
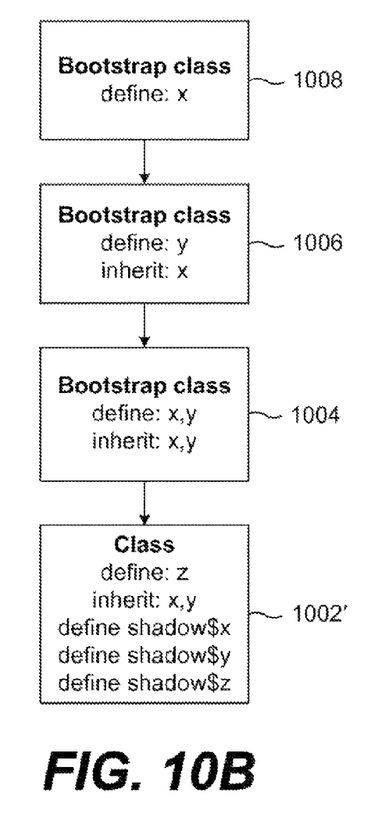

FIGS. 10A-10B are illustrative drawings of another class hierarchy before (FIG. 10A) and after (FIG. 10B) instrumentation according to the process of FIG. 8 to add analysis fields in accordance with some embodiments of the invention. Referring to FIG. 10A, a first non-bootstrap class 1002 defines field z and inherits declarations for fields x and y from a second non-bootstrap class 1004. The second bootstrap class 1004 defines fields x and y and inherits definitions of fields x and y from a third bootstrap class 1006. The third class 1006 defines field y and inherits a definition of field x from a fourth bootstrap class 1008. The fourth bootstrap class 1008 defines field x.

FIG. 10B shows that the process of FIG. 8 results in modified first non-bootstrap class having analysis fields shadow$x, shadow$y and shadow$z. FIG. 10B shows that in some embodiments, when adding analysis fields to a non-bootstrap class that is a direct descendant of a bootstrap class, analysis fields are added for all fields in all of the bootstrap class superclasses, all the way up the class hierarchy (including interfaces). For example, the second bootstrap class 1004 descends from the third bootstrap class 1006, which descends from the fourth bootstrap class 1008. The modified first non-bootstrap class 1002' that descends from the second bootstrap class 1004 includes analysis fields for the second, third and fourth bootstrap classes. However, since the same field names x and y are declared in more than one of the second, third and fourth non-bootstrap classes, only one analysis field each need be added to the first non-bootstrap class for each such field name x and y.

In some embodiments, reflection techniques are employed by blocks 808 and 816 to obtain information about extended classes and by block 812 to use information obtained about an extended bootstrap class to modify a (non-bootstrap) class through the addition of an analysis field corresponding to a field of the bootstrap class. In the above-described example in FIGS. 9A-9B, the second class 904/904' is modified through the addition of analysis fields shadow$a and shadow$b that correspond to fields a and b that are declared in extended (bootstrap) classes 906 and 908, respectively.

In a computer programming context, refection refers to the ability of a program to examine and control its own implementation. Introspective reflection includes the ability to inspect data structures, for example, inspecting a class definition. Structural reflection allows a program to change the definition of class at load time, for example. See, for example, Core Java 2, volume 1, chapter 5 starting at page 228, for a discussion of reflection in an object oriented programming environment.

The foregoing description and drawings of preferred embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. A method to instrument application program code for a virtual machine comprising:
   in the course of loading an application class, which is a constituent of the application program code, to a virtual machine, determining whether the application class is an application subclass that is a direct descendent of an application superclass that is an application bootstrap class and whether the application class inherits at least one field declared in at least one of the application bootstrap class and an application superclass of the application bootstrap class;
   in response to determining that the application class is an application subclass of an application superclass that is an application bootstrap class and that the application class inherits a field declared in at least one of the application bootstrap class and an application superclass of the application bootstrap class, adding code to the application subclass that is a direct descendent of the application bootstrap class to declare an analysis field for use by instrumentation code that corresponds to the inherited field declared in at least one of the application bootstrap superclass and an application superclass of the bootstrap class.

2. The method of claim 1,
   wherein determining includes determining whether the application class is a subclass of an application superclass that is a bootstrap class that was loaded before the class.

3. The method of claim 1,
   wherein determining includes determining whether the application class is a subclass of an application superclass that is a bootstrap class that was loaded before the class;
   wherein the class is a constituent of a user application.

4. The method of claim 1,
   wherein the application subclass declares another field; and further including:
   in the course of loading the application subclass to the virtual machine, adding code to the application subclass to declare an analysis field that corresponds to the another field declared in the subclass.

5. The method of claim 1 further including:
   in the course of loading another application class to a virtual machine, determining whether the another application class is a subclass of a superclass that is a bootstrap class;
   in response to determining that the application class is a subclass of an application superclass that is an application bootstrap class and that the class inherits a field declared in an application superclass of the bootstrap class, adding code to the application subclass to declare an analysis field for use by instrumentation code that corresponds to a field declared in the application superclass of the bootstrap class.

6. The method of claim 1 further including:
   in the course of loading the application class to the virtual machine, adding code to the class to declare an analysis field that corresponds to another field declared in the subclass.

7. The method of claim 1 further including:
   providing class names in a non-transitory computer readable storage device;
   wherein determining whether the application class is a subclass that is a direct descendent of an application superclass that is a bootstrap class and whether the application class inherits a field declared in one of the application bootstrap class and a superclass of the application bootstrap class includes referring to the provided names.

8. The method of claim 1,
   wherein determining includes traversing up from the application class to an application superclass to resolve a name of an inherited field within the application class.

9. An article of manufacture that includes non-transitory computer readable media encoded with application program code to perform a process that includes:
   in the course of loading an application class, which is a constituent of the application program code, to a virtual machine, determining whether the application class is a subclass that is a direct descendent of an application superclass that is an application bootstrap class and whether the application class inherits at least one field declared in at least one of the application bootstrap class and an application superclass of the application bootstrap class;
   in response to determining that the application class is a subclass of an application superclass that is an application bootstrap class and that the application class inherits a field declared in at least one of the application bootstrap class and an application superclass of the application bootstrap class, adding code to the application subclass that is a direct descendent of the application bootstrap class to declare an analysis field for use by instrumentation code that corresponds to the inherited field declared in at least one of the application bootstrap superclass and an application superclass of the bootstrap class.

10. A method to instrument application program code for a virtual machine comprising:
    in the course of loading an application class, which is a constituent of the application program code, to a virtual machine, determining whether the application class is a subclass of an application superclass that is a bootstrap class and whether the application class inherits at least one field declared in at least one of the application bootstrap class and an application superclass of the application bootstrap class;

in response to determining that the application class is a subclass of an application superclass that is a bootstrap class, and that the application class inherits a field declared in at least one of the application bootstrap class and an application superclass of the application bootstrap class, adding code to the application subclass to declare an analysis field for use by instrumentation code that corresponds to an inherited field declared in the application bootstrap superclass; and in response to determining that the application class is a subclass of an application superclass that is not a bootstrap class, or that the application class does not inherit a field declared in at least one of the application bootstrap class and an application superclass of the application bootstrap class, not adding code to the application subclass to declare an analysis field for use by instrumentation code that corresponds to the inherited field declared in the application superclass.

11. The method of claim 10,
wherein determining includes determining whether the application class is a subclass of an application superclass that is a bootstrap class that was loaded before the application class.

12. The method of claim 10,
wherein the application class is a constituent of a user application.

13. The method of claim 10,
wherein the application subclass is a direct descendent of the application superclass class.

14. The method of claim 10,
wherein the application subclass declares another field; and further including:
in the course of loading the application subclass to the virtual machine, adding code to the application subclass to declare an analysis field that corresponds to the another field declared in the application subclass.

15. The method of claim 10 further including:
adding code to the application class to declare a field that corresponds to a field declared in the application bootstrap class only if the application class extends the application bootstrap class and only if the application class is a direct descendent of the application bootstrap class in the course of loading the application class to the virtual machine, adding code to the application class to declare an analysis field that corresponds to another field declared in the application subclass.

16. The method of claim 10,
wherein determining includes determining whether the application class is a subclass of an application superclass that is a bootstrap class that was loaded before the application class;
wherein the class is a constituent of a user application.

17. The method of claim 10,
wherein the application subclass is a direct descendent of the superclass class.

18. The method of claim 10 further including:
in the course of loading another application class to a virtual machine, determining whether the another class is an application subclass of a superclass that is an application bootstrap class;
in response to determining that the application class is an application subclass of a superclass that is an application bootstrap class and that the class inherits a field declared in an application superclass of the bootstrap class, adding code to the application subclass to declare an analysis field for use by instrumentation code that corresponds to a field declared in the application superclass of the application bootstrap class.

19. The method of claim 10 further including:
providing class names in a non-transitory computer readable storage device;
wherein determining whether the application class is a subclass that is a direct descendent of an application superclass that is an application bootstrap class and whether the application class inherits a field declared in one of the application bootstrap class and an application superclass of the application bootstrap class includes referring to the provided names.

20. The method of claim 10,
wherein determining includes traversing up from the class to an application superclass to resolve a name of an inherited field within the application class.

* * * * *